DATA PROCESSING SYSTEM

Inventors
R.P.E.F. Salado
B J.R.A. Fontaine
D.J. Rose
By [signature] Attorney

*Inventors*
R.P.E.F. Salade
B. J. R. A. Fontaine
D. J. Rose

By [signature] *Attorney*

Inventors
R.P.E.F. Salade
B.J.R.A. Fontaine
D.J. Rose
By [signature] Attorney

United States Patent Office 3,562,716
Patented Feb. 9, 1971

3,562,716
DATA PROCESSING SYSTEM

Bernard Jean Robert André Fontaine and Robert Pierre Emile Ferdinand Salade, Antwerp, Belgium, and Desne Jean Rose, Blunsdon, England, assignors to International Standard Electric Corporation, New York, N.Y., a corporation of Delaware
Filed Jan. 17, 1968, Ser. No. 698,610
Claims priority, application Belgium, Jan. 24, 1968, 693,071
Int. Cl. G06f *11/04, 15/16*
U.S. Cl. 340—172.5 40 Claims

ABSTRACT OF THE DISCLOSURE

This case discloses a control system associated to two processing units operating on a load-sharing basis and storing test and restoring programmes in a memory outside these units. When a processor is faulty a series of test programmes is performed in this faulty processor and repeated as long as the programme is not successfully executed. When a processor has been tested successfully data necessary to start its operation is copied from the other processor or from the memory of the control system depending on this other processor correctly operating or not. During the test and restoring operations the faulty processor informs the other processor of each change of status by means of five status bistables. When both processors are faulty they are tested alternately under the control of a supervision circuit.

The invention relates to a data processing system including two programme controlled processing units and means for carrying out testing and restoring programmes after detection of at least one faulty processing unit. The testing and restoring programmes are adapted to test the faulty processing unit and to restore to operative condition a successfully tested processing unit.

Such a data processing system is already known from the Bell System Technical Journal of Sept 1964, No. 5, part 1. In this known system said test and restoring programmes are stored in each of the memories of said processing units. This is an expensive solution. Moreover the execution of these programmes necessitates the intervention of the correctly operating processing unit so that operation time of the latter is consumed and that hence the traffic capable of being handled by this unit is deceased.

It is, therefore, an object of the present invention to provide a data processing system which does not present these drawbacks.

The data processing system, according to the invention, is characterized in that it includes a control system associated to both said processing units and storing said test and restoring programmes in a memory outside said processing units.

According to another characteristic of the present data processing system the execution of the test and restoring programmes involves said control system and said faulty processing unit and that said test programme is performed substantially independently from the other processing unit.

According to still another characteristic of the present data processing system the memory of said control system is a tape memory.

The above mentioned and other objects and features of the invention will become more apparent and the invention itself will be best understood by referring to the following description of embodiments taken in conjunction with the accompanying drawings wherein:

FIG. 1 is a schematic view of a data processing system according to the invention;

FIG. 2 schematically shows the circuits involved in the execution of test and restoring programmes by the data processing system of FIG. 1;

Figure 1:
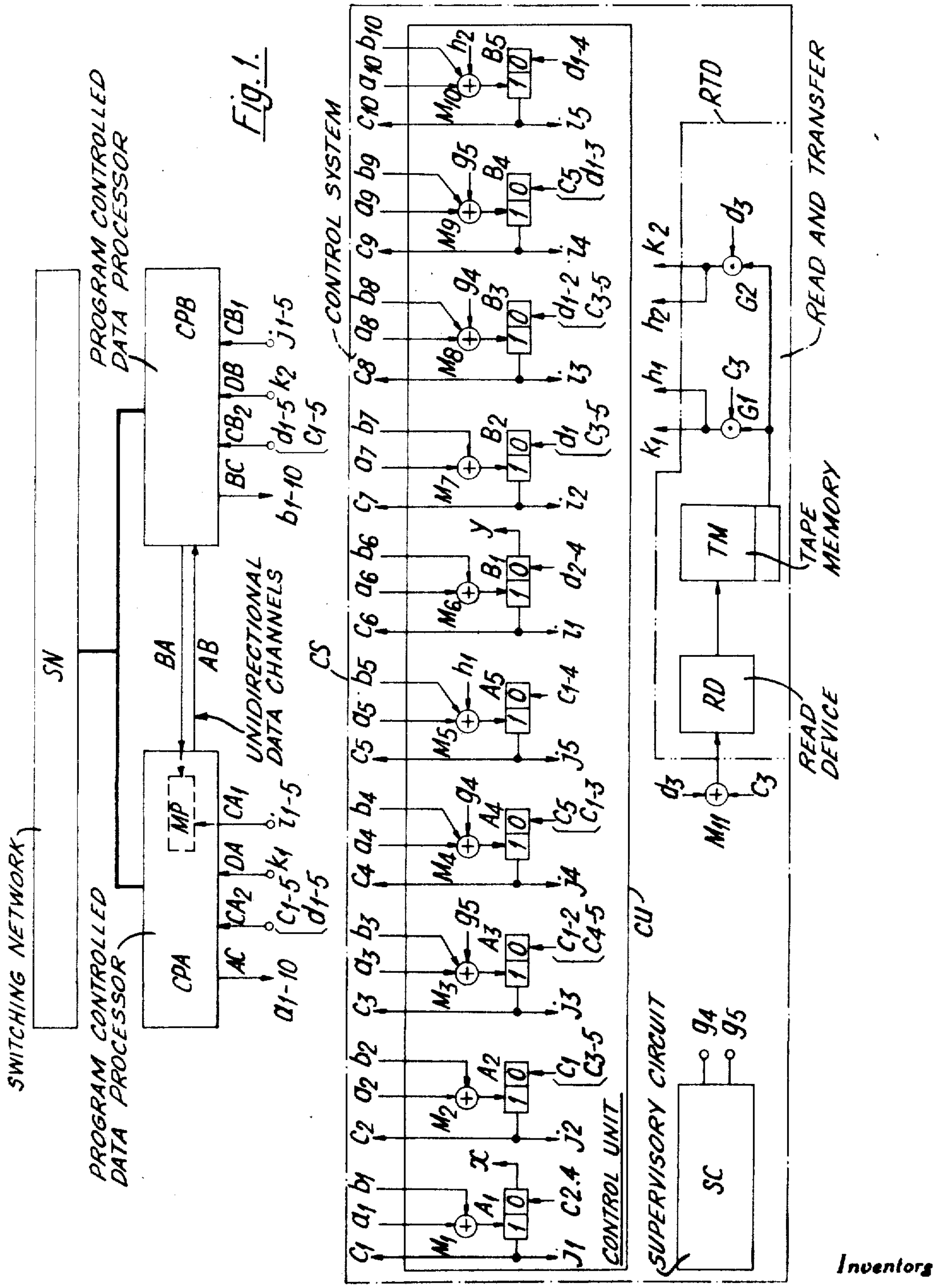

Principally referring to FIG. 1, the data processing system, e.g. an automatic telecommunication switching system. It includes a switching network SN and two identical programme-controlled processing units CPA and CPB which are coupled to this switching network and interconnected via the unidirectional channels AB and BA. This data processing system operates in the manner disclosed in the United States patent application Ser. No. 698,870 filed by applicant on Jan. 18, 1968 and entitled "Automatic Telecommunication Switching System and Information Handling System" (S. Gobus—A. Salle—B. Fontaine—A. Termote—J. Masure 19–4–1–2–13).

This operation will therefore not be described in detail. It should however be noted that these processing units operate on a load-sharing basis. When a faulty processing unit is detected the other processing unit takes over the control of the operations, already controlled by the faulty one, under the control of a so called take-over programme. Also, each processing unit regularly, i.e. every 14 milliseconds, receives a clock signal from the other processing unit under the control of an interprocessor interrupt programme. The former unit is thus informed that the latter unit has started the execution of a so called clock interrupt programme which has interrupted therein a base level programme i.e. the programme normally executed in each pocessing unit.

The present data processing system includes a control system CS which includes itself a control unit CU with two groups of bistate devices A1–5 and B1–5, a supervision circuit SC and a read and transfer device RTD. A tape memory TM has the test and restoring programmes registered thereon. These programmes are executed after detection of at least one faulty processing unit, and adapted to test this faulty processing unit, and to restore to operative condition a successfully tested processing unit. The restoring programme comprises a copying programme and a read and transfer programme, only one of these programmes being executed.

The control unit CU includes two groups of bistate devices A1–5 and B1–5 associated to the processing units CPA and CPB respectively. These bistate devices are so-called processing unit condition modification start means. When brought in their 1-condition, they are each adapted to start the modification of the condition of the associated processing unit into a condition for which the bistate device is representative.

The first of these bistate devices A1 and B1 each indicate the operative or on-line condition of the associated processing unit. When brought in its 1-condition, each bistable device starts the modification of the condition of the associated processing unit CPA or CPB into the operative or on-line condition. The second of these bistate devices A2 and B2 each indicate the copying condition of the associated processing unit. When brought in its 1-condition, each one starts the modification of the condition of the associated processing unit CPA or CPB into the condition wherein it is ready to execute the above mentioned copying programme. The third of these bistate devices A3 and B3 each indicate the reading condition of the associated processing unit. When brought in its 1-condition, each one starts the modification of the condition of the associated processing unit CPA or CPB into the condition wherein it is ready to store in its memory the programme read in the above mentioned tape memory TM of the control system CS. The fourth of these bistate devices A4 and B4 each indicate the stop condition of the associated processing unit. When brought in its 1-condition starts the modification of the condition of the associated processing unit CPA or CPB into the non-operative or stop condition. Finally, the fifth of these bistate devices A5 and B5 each indicate the test condition of the associated processing unit. When brought in its 1-condition, each one starts the modification of the condition of the associated processing unit into the condition wherein it is ready to execute tests.

The processing units CPA and CPB are connected to the 1-inputs of the bistate devices A1–5 and B1–5 via the control leads *a*1–10 of channel AC and the heads *b*1–10 of channel BC, each time via the OR-gates M1–10. Each of these bistate devices may hence be set to its 1-condition by any of the processing units. This means that each of the processing units CPA and CPB is able to completely control the other through the bistate devices B1–5 and A1–5 respectively. The latter are able to modify the condition of the processing unit CPB and CPA respectively.

The processing unit CPA is further connected to the 1-outputs of the bistate devices B1–5 via the interrupt leads *i*1–5 forming the interrupt channel CA1. Whereas, the processing unit CPB is further connected to the 1-outputs of the bistate device A1–5 via the interrupt leads *j*1–5 forming the interrupt channel CB1.

In this manner, the change of condition of any of these bistate devices is automatically communicated via the interrupt channel CA1 or CB1 to the processing unit CPA or CPB to which this bistate device is not associated. The channels CA1 and CB1 are called interrupt channels because information (e.g. the change of condition of one of the bistate devices, B1–5, A1–5) transmitted thereon is entered in the corresponding processing unit CPA or CPB. This entry is under the control of a so called control system interrupt programme. The latter programme is analogous to the interprocessor input interrupt programme described in the above mentioned patent application. This control system interrupt programme however has a priority only higher than that of the base level programme which, as mentioned above, is the programme normally executed in each processing unit.

Finally, the processing unit CPA is also connected to the 1-outputs of the bistate devices A1–5 and B1–5 via the test leads *c*1–5 and *d*1–5 which form the channel CA2. Whereas the processing unit CPB is also connected to the 1-output of the bistate devices B1–5 and A1–5 via the test leads *d*1–5 and *c*1–5 which form the channel CB2. Each processing unit may hence test the condition of any of the bistate devices A1–5, B1–5.

The outputs *c*1–5 of the bistate devices A1–5 are connected to the 0-inputs of the bistate devices A2, A3, A4, A5; A1, A3, A4, A5; A1, A2, A4, A5; A1, A2, A3, A5; A2, A3, A4 via not shown OR-gates respectively. Thus, the 0-inputs of the bistate devices A1–5 are connected to the test leads *c*2–4; *c*1 and *c*3–5; *c*1–2 and *c*4–5; *c*1–3 and *c*5; *c*1–4 respectively. Due to this, when one of the bistate devices A1–4 is set to its 1-condition, the bistate device of the group set responsive thereto is reset to its 0-condition. Whereas, when the bistate device A5 is set to its 1-condition the bistate device A1 remains in the condition it has at that moment. The A1 and A5 are the on-line condition bistate device and the test condition bistate device, respectively. This means that when A1 and A5 are simultaneously in their 1-condition the processing unit CPA is in the condition to execute on-line test. Thus, when only A5 is in its 1-condition, the processing unit CPA is in the condition to execute off-line tests.

The outputs *d*1–5 of the bistate devices B1–5 are connected in a manner analogous to the outputs *c*1–5.

The read and transfer device RTD includes a reading device RD, the input of which is connected to the output of the OR-gate M11. The inputs of this gate are connected to the 1-outputs *c*3 and *d*3 of the reading mode bistate devices A3 and B3. Hence this reading device RD is operated when one of the latter bistate devices is set to its 1-condition. When operated, this read device RD reads the above mentioned test of the restoring programmes from the tape memory TM. It also transfers the read programme via the gate G1 or G2 and the respective lead *k*1 or *k*2 forming the transmission channel DA or DB, to the corresponding processing unit CPA or CPB depending on control lead *d*3 or *c*3 being activated. This transfer depends on bistate device A3 or B3 having caused the operation of the read and transfer device RTD. When the programme read comprises an order to set the bistate device A5 or B5, this bistate device is set via the gate G1 or G2, the control lead *h*1 or *h*2, other not shown gating means and the OR-gate M5 or M10 respectively.

Figure 2:
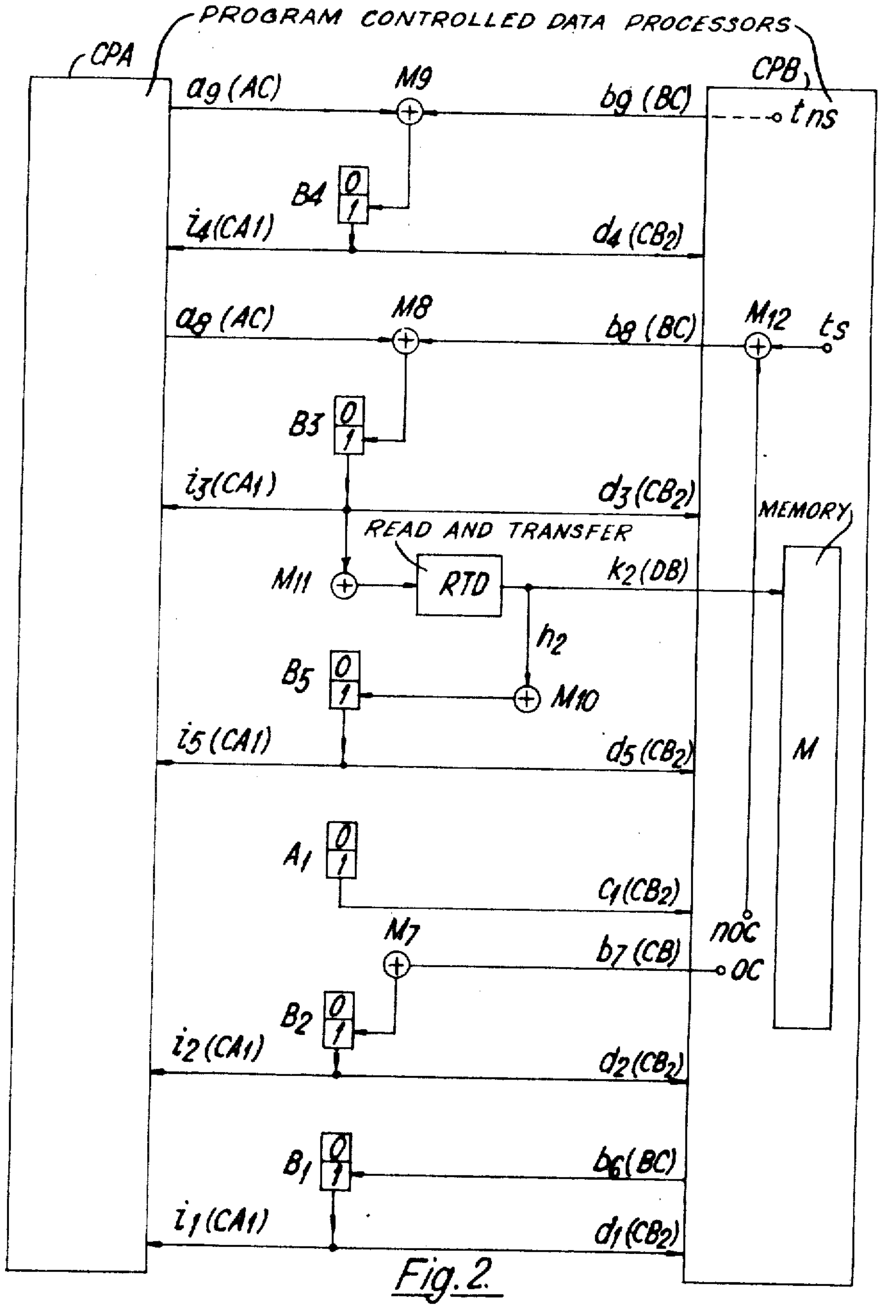

The reference to FIGS. 1 and 2, the test and restoring programmes are executed after detection of a faulty processing unit. How such a faulty processing unit may be detected has already been disclosed in the above mentioned U.S. patent application and other means able to do this will be described later.

Assuming processing unit CPA has detected that processing unit CPB is faulty, the former unit sets the stop condition bistate device B4 to the 1-condition via the control lead *a*9 of channel AC and the OR-gate. Due to this the 1-output of this, bistate device B4 is activated, and the processing unit CPA is informed of the change of condition of B4 via the interrupt lead *i*4 forming part of the interrupt channel CA1. The processing unit CPB is informed thereof via the test lead *d*4 forming part of the channel CB2. Due to the setting of B4, the beginning of the tape of the tape memory TM is brought in front of the reading device RD. After having been informed the processing unit CPB modifies its present condition into the stop condition indicated by the bistate device B4. The above change-of-condition information is entered in the processing unit CPA during an above mentioned control system interrupt programme. After having analyzed this information, the processing unit CPA sets the bistate device B3 to its 1-condition via the control lead *a*8 forming part of channel AC and the OR-gate M8.

It should be noted that bistate device B3 has been set by processing unit CPA instead of directly by processing unit CPB. This is because the processing unit CPA is capable of doing so, whereas it is not certain that processing unit CPB is operative.

Since bistate device B3 has been set to its 1-condition, the processing unit CPA is informed thereof via the interrupt channel CA1 comprising the activated interrupt lead *i*3. After having analyzed the information received, and more particularly by noting that it is the first change of condition of the bistate device B3, the processing unit CPA knows that it may execute an above mentioned takeover programme. Also the processing unit CPB is informed of the setting of B3 via the test lead *d*3 of the channel CB2. Consequently the processing unit CPB is put in the reading mode condition. It is then able to enter read information in its memory M. Finally, the operation of the read and transfer device RTD is started via the activated test lead *d*3 and the OR-gate M11. More particularly, the reading device RD is operated according to the part of the programme inscribed on the tape memory TM is read and transferred to the memory M of the processing unit CPB via the gate G2 and the lead *k*2 forming channel DB.

This programme part is read and transferred. Then, in a first test subprogramme, the reading device RD reads the order "set test condition bistate device B5 to its 1-condition." Consequently this bistate device B5 is set to its 1-condition via the gate G2, the output lead *h*2, other not shown gating means and the OR-gate M10. The bistate device B3 is reset to its 0-condition.

Due to the bistate device B5 having been set to its 1-condition, the processing unit CPA is informed thereof via the interrupt channel CA1 comprising the activated interrupt lead *i*5. The processing unit CPB is informed of this change of condition via the test lead *d*5 forming part of the channel CB2. This change of condition information is entered in the processing unit CPA under the control of a control system interrupt programme. On the other hand, upon having been informed via the channel CB2 that bistate device B5 has been set to its 1-condition, the processing unit CPB modifies its present condition into the test condition. Then, it is able to execute the first test subprogramme which has been stored in its memory.

After the execution of this first test subprogramme, the processing unit CPB activates the terminal *ts* or *tns* depending on the first test programme having been successfully executed or not. In the latter case, the stop bistate device B4 is set to its 1-condition via the control lead *b*9 of channel B6 and the OR-gate 9. The beginning of the tape of the tape memory TM is brought in front of the reading device RD. The above described procedure is repeated. An alarm circuit (not shown) is included in the system in order that the unsuccessful execution of the first test subprogramme should be stopped after a predetermined time interval. Maintenance personnel are thus informed, and they start the repair of the faulty processing unit. In case the execution of the first test subprogramme has been successful, the reading condition bistate device B3 is set to its 1-condition via terminal *ts*, OR-gate M12, control lead *b*8 of channel BC and OR-gate M8.

The above test procedure is then continued in an analogous manner by the execution of a second test subprogramme read on the tape memory TM. If this second test is not successful, the bistate device B4 is again set to its 1-condition. The first and second tests are both repeated since the beginning of the tape is again brought in front of the reading device RD. If the second test is successful, a third test is executed etc. until the final test has been successfully executed. In this case, the processing unit CPA may be restored into its operative condition. This is the aim of the execution of the restoring programme which will be described hereinafter.

After the successful execution of the final test subprogramme, the terminal *ts* is again activated. The bistate device B3 is set to its 1-condition via the OR-gate M-12, the control lead *b*8 of channel BC and the OR-gate M8.

In the analogous manner, as described above for the test programme, a restoring programme is then read from the tape memory TM and entered in the memory N of the processing unit CPB. Thereafter, the latter processing unit CPB executes the restoring programme stored. An instruction of this restoring programme consists in testing the condition of the bistate device A1 in order to know whether the other processing unit CPA is still in its operative condition or not. Processing unit CPB performs this operation by checking the condition of the test lead *c*1 of channel CB2. The channel is activated or deactivated when the processing unit CPA is in its operative or non-operative condition respectively. In the former case, the terminal *oc* is activated. In the latter case, the terminal *noc* is activated.

Under the control of the stored restoring programme and when the terminal *oc* is activated, the processing unit CPB sets the bistate device B2 to its 1-condition via the control lead *b*7 of channel BC and the OR-gate M7. Consequently, the processing unit CPA is informed, via the interrupt lead *i*2 of interrupt channel CA1. This is carried out under the control of a control system interrupt programme, indicating that a copying programme must be executed. Also the processing unit CPB is informed of this change of condition of the bistate device B2 via the test lead *d*2 of channel CB2. Consequently, the processing unit CPB modifies its present condition into the copying condition. It is then able to copy in its memory M the information stored in the memory of the processing unit CPA.

The transfer of the contents of the latter memory to that of the processing unit CPB is performed via the interprocessor channel AB under the control of interprocessor input and output interrupt programmes. This process is extensively described in the above mentioned Dutch patent application. When this copying operation is finished the processing unit CPB sets the bistate device B1 to the 1-condition via the control lead *b*6 of channel CB. Subsequently, the processing unit CPA is informed thereof under the control of a control system interrupt programme, such information is via the interrupt lead *i*1 of the interrupt channel CA1. The processing unit CPB (after having been informed via test lead *d*1 of channel CB2) modifies its condition into the operative or on-line condition.

When on the contrary terminal *noc* is activated, the processing unit CPB executes a read and transfer programme under control of the restoring programme stored. It sets the bistate device B3 to its 1-condition via the OR-gate M12, the control lead *b*8 of channel BC and the OR-gate M8. Thus, the read and transfer device RTD is started via OR-gate M11. An operational programme read on the tape memory TM is transferred into the memory M of processing unit CPB. At the end of this operation, and in the same manner as described above in relation to the copying programme, the processing unit CPB then sets the bistate device B1 to the 1-condition. Thereafter this processing unit modifies its condition into the operative or on-line condition.

Summarizing, depending upon the processing unit CPA being in its operative condition or not the successfully tested processing unit CPB is made operative after having copied in its memory M the contents of the memory of the processing unit CPA. It may also be made operative after having stored in its memory an operational programme read from the tape memory TM. The latter programme being obviously simpler than that stored in the memory of the processing unit CPA. The copied programme is as sufficient as the operational programmes for the processing unit CPB to execute all the functions required when in the operative condition.

Figures 3, 4:
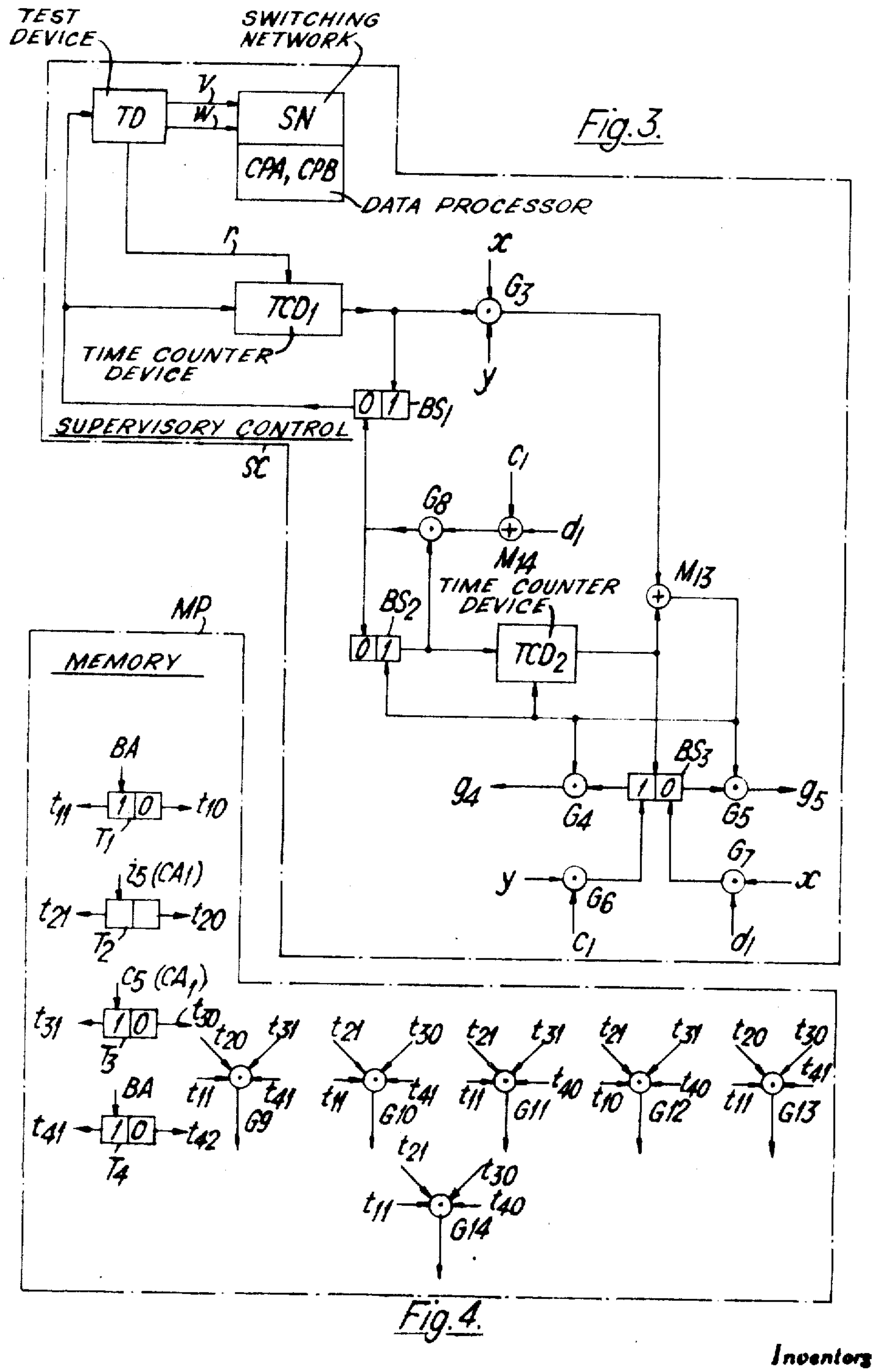
FIG. 3 represents in detail the part indicated by SC in FIG. 1.
FIG. 4 shows in detail the part indicated by TC in FIG. 1.

Principally, referring to FIG. 3, the supervision circuit SC shown therein includes a routine test device TD. The input of this circuit is connected to the 0-output of the enabling bistate device BS1. The latter output is also connected to the input of the time counter device TCD1. The routine test device TD is connected to two test lines of the switching network SN via the leads *v* and *w*. Its output *p* is connected to the reset input *r* of the time counter device TCD1.

When the enabling bistate device BS1 is brought in its 0-condition, the routine test device TD and the time counter device TCD1 are started simultaneously.

The routine test device TD then alternately closes (e.g. every 3 minutes) the loops of the above two test lines. Subsequently, it detects the presence or absence of dial tone on these lines. This constitutes a test of the system and more particularly of the two processing units CPA and CPB. Indeed, upon the closure of the loop of such a said test line, the one or the other of these processing units controls the establishment of a connection between this test line and a junctor. Subsequentially, this connection applies dial tone to this line. The presence or absence of dial tone on the test lines is hence an indication of the correct or faulty condition of the switching network and/or processing units, assuming that the test device TD operates correctly.

If dial tone is present on either one of these test lines after a routine test, the output *p* of the routine test device TD is activated. This activation is due to which of the time counter device TCD1 is reset to its 0-condition. In the absence of dial tone on each of these lines, after the execution of routine tests, the output *p* of the routine test device TD remains de-activated. If, during the time interval adapted to be counted by the time counter device TCD1, the above routine tests are all unsuccessful, the output *o* of the time counter device TCD1 is activated. The activation is according to which of the enabling bistate device BS1 is set to its 1-condition. Thus, the operation of the routine test device TD and of the time counter device TCD1 is inhibited and one input of the AND gate G3 is activated.

The other two inputs of this gate G3 are connected to the 0-outputs *x* and *y* of the on-line condition bistate devices A1 and B1. Hence, the output of the gate G3 is activated when both these bistate devices A1 and B1 are in their 0-condition, indicating herewith that both the associated processing units CPA and CPB are in the non-operative condition. Consequently, and via the OR-gate M13, the time counter device TCD2 is then reset to its 0-condition. The bistate device BS2 is set to its 1-condition. The one inputs of the AND-gates G4 and G5 are activated.

The 1-output of the bistate device BS2 is connected to the input of the time counter device TCD2, and the other inputs of the gates G4 and G5 are connected to the 1-output. The 0-output of the bistate device BS3 is arranged as a scale-of-two counter. The outputs *g*4 and *g*5 of the gates G4 and G5 are connected to the 1-inputs of the bistate devices A4, B3, and A3, B4 via the OR-gates M4, M8 and M3, M9, respectively.

The output of the time counter device TCD2 is connected to the common input of this scale-of-two counter. The 1 and 0-inputs of the latter counter are connected to the outputs of the AND-gates G6 and G7. The inputs of the gate G6 are connected to the 1-output *c*1 of the bistate device A1 and to the 0-output *y* of the bistate device B1. The inputs of the gate G7 are connected to the 1-output *d*1 of the bistate device B1 and to the 0-output *x* of the bistate device A1. From this, it follows, that the 1-output or the 0-output of the scale-of-two counter BS3 is activated when the processing unit CPB or CPA is brought in its non-operative condition, respectively. The latter condition is indicated by the 0-condition of the associated bistate device B1 or A1.

Assuming that the processing unit CPB is the last of the two processing units which has been brought in its non-operative condition, the output of the gate G6 and hence the 1-output of the scale-of-two counter BS3 is activated. Therefore, as a consequence of the above mentioned activation of the output of the gate G3, the output *g*4 of the gate G4 is activated. Due to this, the bistate devices A4 and B3 are set in the 1-condition. As a consequence thereof, the execution of the test and restoring programmes described in relation to FIG. 2. is started in the processing unit CPB. During the execution of these programmes, the time counter device TCD2 is operating. As described above the bistate device BS2 has been set to its 1-condition upon the output of the AND-gate G3 having been activated.

When the processing unit CPB has been successfully tested and restored to operative condition, before the end of the maximum time interval able to be counted by the time counter device TCD2, the output of the OR-gate M14, which is controlled by the 1-outputs *c*1 and *d*1 of the bistate devices A1 and B1, is activated due to B1 having been activated. Hence, the one input of the AND-gate G8 is activated. The other input of this gate is activated due to the 1-output of the bistate device BS2 being activated. As a consequence thereof, the output of the gate G8 is activated. The bistate devices BS1 and BS2 are both reset to their 0-condition. Thus, the operation of the routine test device TD and the time counter device TCD1 is again started. The operation of the time counter device TCD2 is inhibited.

When the processing unit CPB has not been successfully tested and restored to operative condition at the end of the maximum time interval able to be counted by the time counter device TCD2, the output of this time counter device TCD2 is activated. As a consequence thereof, the scale-of-two counter BS3 is switched to the condition wherein its 0-output is activated. The one inputs of the gates G4 and G5 are activated via the OR-gate M13. Thus, the output *g*5 of the gate G5 is activated. The bistate devices A3 and B4 are set to their 1-condition. Consequently, the execution of the above test and restoring programme, is now started in the processing unit CPA.

Summarizing, when the routine test device TD has detected that the routine test operations are unsuccessful. When both the processing units are in their unoperative condition, these processing units are alternately programme tested, starting with the one which last became faulty and continuing until one of the processing units has been successfully tested. Manual controlable means (not shown) are provided in order to stop these alternative programme testing operations when none of the processing units is restored to operative condition within a predetermined time interval.

In case the routine testing operation is unsuccessful, but at least one of the processing units is in the operative condition, one may conclude that the routine test device is probably faulty. Therefore, this device is then tested by the maintenance personnel.

As already mentioned above, when the first and fifth bistate devices associated with a processing unit are both in their 1-condition, this processing unit is in a condition to execute on-line test programmes. Principally referring to FIG. 4, the on-line tests executed by the processing unit CPA are described hereinafter. These on-line tests comprise four tests which are executed as base level programmes. The results of the tests are stored in a memory part MP (FIG. 1) of the processing unit CPA.

The first test consists in controlling the receipt in the processing unit CPA of a clock signal which is transmitted every 14 milliseconds by the processing unit CPB towards the processing unit CPA via the interprocessor channel BA. When this signal is received in the unit CPB, the bistate device T1 is set to its 1-condition, since they must be able to transmit the above clock signal, unit CPB by means of this test, not only it is tested, but also the interprocessor channel BA is tested since this clock signal is transmitted to the processing unit CPA via this channel BA.

The second test consists in setting the bistable device B5 to its 1 condition, via the control lead *a*10 of the channel AC. This channel is in control of the receipt of the corresponding answer signal indicating the change of condition of B5 and transmitted to the processing unit CPA via the interrupt lead *i*5 of the interrupt channel CA1. When this answer signal is correctly received in the processing unit CPA, the bistate device T2 is set to its 1-condition. It is clear that by means of this test, the channels AC and CA1 and the bistate device B5 are tested.

The third test consists in setting the bistate device B5. This setting is via the interprocessor channel AB and the control lead *b*10 of the channel BC. The test consists of controlling the receipt of the corresponding answer signal indicating the change of condition *f*18 and transmitting to the processing unit CPA via the interrupt lead *i*5 of the interrupt channel CA1. When this information is received the bistate device T3 is set to its 1-condition. It is clear that, by means of this test, the channels AB, BC and CA1 and the bistate device B5 are tested.

Finally the fourth test consists of transmitting, via the interprocessor channel AB, information to the processing unit CPB. The information is processed so as to thoroughly test the unit. This test resides in controlling the receipt of an answer signal transmitted by the processing unit CPA via the interprocessor channel BA and indicating the execution of this test. When this answer signal is received in the unit CPA, the test bistate device T4 is set to its 1-condition. It is clear that, by means of this test, he interprocessor channels A Band BA and the processing unit CPB are tested.

The 0-outputs $t10$, $t20$, $t30$ and $t40$ and the 1-outputs $t11$, $t21$, $t31$, and $t41$ of the above bistate devices T1–4 are connected to six AND gates G9 to G14 the outputs of which are activated when G9: only test 2 is unsuccessful;
G10: only test 3 is unsuccessful;
G11: only test 4 is unsuccessful;
G12: only tests 1 and 4 are unsuccessful;
G13: only tests 2 and 3 are unsuccessful;
G14: only tests 3 and 4 are unsuccessful.

When the output of gate G9 is activated, for example, when only test 2 is unsuccessful, one may conclude that channel AC is faulty. Indeed, the second test involves the elements AC, B5 and CA1, but B5 and CA1 are correct since the third test, which also involves the latter elements, is successful. When channel AC is faulty the control system CS is rendered inoperative.

When the output of gate G10 is activated (i.e. when only test 3 is unsuccessful) one may conclude that channel BC is faulty. Indeed, the third test involves the elements AB, BC, B5 and CA1. However, AB, B5 and CA1 are correct since the other tests which also involve the latter elements are successful. When channel BC is faulty, the control system CS is rendered inoperative.

When the output of gate G11 is activated (i.e. when only test 4 is unsuccessful) one may conclude that the processing unit CPB is faulty. Indeed, the fourth test involves the elements AB, BA and CPB. However, AB and BA are correct since the first and third tests which also involve the latter elements are successful. When processing unit CPB is faulty, this processing unit and the channel BA are rendered inoperative.

When the output of gate G12 is activated (i.e. when only tests 1 and 4 are unsuccessful) one may conclude that CPB or BA is faulty. It is assumed that there is only one fault at the time. Indeed, the first and fourth tests involve the elements CPB, AB and BA. However, element AB is correct since it is also involved in the third test which is successfully executed. It is not absolutely necessary to know if either CPB or BA is faulty since when the processing unit CPB is put out of order the same is done with the interprocessor channel BA which is considered as being associated to CPB.

When the output of gate G13 is activated (i.e. when only tests 2 and 3 are unsuccessful) one may conclude that channel CA1 or bistate device B5 is faulty. Indeed, the second and third tests involve the elements AC, B5, CA1, AB and BC. However, the element AB is correct since the fourth test is successful. On the other hand, if AC is the only faulty element, then the third test cannot be unsuccessful since it does not involve AC. Also, if BC is the only faulty element, then the second test cannot be unsuccessful since it does not involve BC. Hence CA1 or B5 must be faulty. The same result may be obtained by noting that since the second and third tests both involve CA1 and B5 and are both unsuccessful it is probably one of the latter elements which is faulty, again assuming there can only be one fault at the time.

Finally, when the output of gate G13 is activated (i.e. when only tests 3 and 4 are unsuccessful) one may conclude that channel AB is faulty.

From the above, it follows that by executing on-line tests, each processing unit is regularly informed about the condition of the other processing unit and other elements of the system. In the function of this information, it may take appropriate actions e.g. rendering inoperative the other processing unit.

While the principles of the invention have been described above in connection with specific apparatus, it is to be understood that this description is made only by way of example and not as a limitation on the scope of the invention.

We claim:

1. A data processing system including two programme controlled central processing units,
means for detecting faulty ones of said units,
means to carry out testing and restoring programmes responsive to the detection of at least one faulty processing unit by said last named means,
said testing and restoring programmes being adapted to test said faulty processing unit,
means for restoring to operative condition a successfully tested one of said processing units, and
control system means associated with both of said processing units,
said control system means storing said testing and restoring programmes in a memory outside of said processing units.

2. The data processing system according to claim 1, and
means including said control system means for executing said testing and restoring programmes, and
means for performing said test programme on the faulty processing unit substantially independently of the testing of the other non-faulty processing unit.

3. The data processing system according to claim 2, characterized in this, that said test programme is stored in the memory of said control system and a series of test subprogrammes, and
means for transferring said series of test subprogrammes and said restoring programme to said faulty processor and to said successfully tested fautly processor respectively in order to be subsequently executed.

4. The data processing system according to claim 3 and means whereby said test subprogrammes of said series are successively transferred to and are each executed by said faulty processing unit responsive to the successful execution of the preceding transferred test subprogramme, and
means responsive to an unsuccessfully executed test of that subprogramme for repeating at least the execution of this test subprogramme.

5. The data processing system according to claim 4 characterized in this, that said restoring programme transferred to and executed by said successfully tested processing unit comprises the steps of checking whether the other processing unit is in the operative condition or not and in subsequently executing a copying programme or read and transfer programme depending on the result of this check,
said copying programme consisting in copying information required for operation of the processing unit from the memory of the other operative processing unit into the memory of the successfully tested processing unit which is afterwards put in operative condition, and
said read and transfer programme consisting in reading and transferring an operational programme required for operation from the memory of the control system into the memory of the successfully tested processing unit which is afterwards put in operative condition.

6. The data processing system according to claim 4 characterized in this, that the memory of said control system includes a tape memory means.

7. The data processing system according to claim 4 characterized in this, that said control system means includes two groups of condition modification start means,
each start means group being associated with a respective one of said processing units, and for starting the modification of the condition of the associated processing unit responsive to the operation of any of said processing units.

8. The data processing system according to claim 7, wherein said condition modification start means comprises bistate devices.

9. The data processing system according to claim 8 and means for switching a first of said bistate devices of each said group into its 1-condition to start the modification of the condition of the associated processing unit, said modification bringing said unit into the operative condition indicated by said first bistate device.

10. The data processing system according to claim 9 and means for bringing a second of said bistate devices of each said group brought into its 1-condition to start the modification of the condition of the associated processing unit, wherein this unit is brought into the condition where it is ready to execute said copying programme, the latter condition being indicated by said second bistate device.

11. The data processing system according to claim 10 and a read out and transfer means, means for bringing a third of said bistate devices of each said group into its 1-condition to start said read out and transfer means, means responsive to said last named means for starting the modification of the condition of the associated processing unit into the condition wherein this unit is ready to store in its memory the information read into said memory of said control system, the latter condition being indicated by said third bistate device.

12. The data processing system according to the claim 11 and means for bringing a fourth of said bistate devices of each said group into its 1-condition to start the modification of the condition of the associated processing unit into the non-operative condition, the latter condition being indicated by said fourth bistate device.

13. The data processing system according to claim 12 and means for bringing a fifth of said bistate devices of each said group into its 1-condition to start the modification of the condition of the associated processing unit into the condition wherein this unit is able to execute test programmes, the latter condition being indicated by said fifth bistate device.

14. The data processing system according to claim 13 and means responsive to the setting of a said first, second, third or fourth bistate device to its 1-condition for resetting each bistate device of the same group to its 0-condition.

15. The data processing system according to claim 13 and means responsive to the setting of said fifth bistate device to its 1-condition for locking the first bistate device of the same group in the condition it has at that moment, whereby when this first bistate device is in its 0-condition the associated processing unit is in a nonoperative condition to perform said testing and restoring programmes, whereas when said first bistate device is in its 1-condition the associated processing unit is in condition to perform on-line test programmes.

16. The data processing system according to claim 13 and a tape memory means, and means responsive to setting said first or fourth bistate device to its 1-condition for driving said tape memory into its start position.

17. The data processing system according to claim 15 and means responsive to the operation of said read-out and transfer device for reading one of said series of test subprogrammes in the memory of said control system, means for thereafter transferring this one test subprogramme to the memory of said faulty processing unit and setting the fifth bistate device associated with said faulty processing unit to its 1-condition for causing said faulty processing unit to execute the test subprogramme means responsive to the successful execution of said test subprogramme for setting said third bistate device to its 1-condition for causing the associated faulty processing unit to again operate said read-out and transfer device to start the processing of another test subprogramme, and means responsive to an unsuccessful execution of said test subprogramme for setting the fourth bistate device associated with said faulty processing unit to its 1-condition for causing the other processing unit to set said third bistate device to its 1-condition and cause said read and transfer device to again operate in order to execute again at least said one test subprogrmme.

18. The data processing system according to claim 17 and means responsive to the successful execution of the last test subprogramme for setting the third bistate device of the successfully tested processing unit to its 1-condition, means for operating said read-out transfer device to successively read said restoring programme in the memory of said control system, means for transferring this programme to the memory of the successfully tested processing unit and setting the fifth bistate device of the latter unit, means responsive to said successfully testing of the processing unit for starting the execution of the restoring programme stored for checking the condition of the first bistate device of the other processing unit, means for setting to its 1-condition depending on the second or third bistate device of said successfully tested processing unit the first bistate device being in its 1-condition or 0-condition, respectively, the setting of said second bistate device to its 1-condition starting the execution of said copying programme and setting of said third bistate device starting the reading of said operational programme followed by the transfer of this programme into the memory of the successfully tested processing unit, the first bistate device of said successfully tested processing unit being set to its 1-condition when the last described operations have been executed.

19. The data processing system according to claim 18 and means responsive to said two processing units for controlling a switching network.

20. The data processing system according to claim 19 and means for operating said processing units on a load-sharing basis.

21. The data processing system according to claim 20 and means wherein each of said processing unit normally executes a base level programme, and means responsive to the change of condition of any of said bistate devices associated to a processing unit for communicating said change to the other processing unit under control of a control system interrupt programme having a order of priority higher than the priority of said base level programme.

22. The data processing system according to claim 21 and means responsive to a correct operation of a processing unit under the control of a said control system interrupt programme for setting the third bistate device of the other faulty processing unit to its 1-condition to start a take-over programme for switching the control of the operations performed by said faulty processing unit to the control of said correctly operating processing unit.

23. The data processing system according to claim 22 and in interprocessor interrupt means, and means for operating said copying programme under the control of said interprocessor interrupt programme means processing a program having priority higher than that of said base level programme and of said control system interrupt programme.

24. The data processing system according to claim 15 wherein said control system means includes a supervision circuit for conducting routine tests on said system to control the programme testing, means in the processing unit which last was indicated as faulty during routine tests for inhibiting the execution of said routine tests during the execution of said programmed tests by both of said processing units when in the non-operative condition.

25. The data processing system according to claim 24 and means effective after a predetermined time interval if one of the programme test processing units has not been restored to its operative condition for operating the other processing unit in the same manner until a processing unit is finally restored to its operative condition, at which moment the control of the programme tests by the supervision circuit is inhibited.

26. The data processing system according to claim 24 and a first counting means, and supervision circuit means including a sixth bistate device set in the 0-output for connecting the inputs of said first time counting means to a routine test device capable of executing routine tests in the system, means for connecting the output of said counting means the reset input of said first time counter means the output (O) of which is connected to the 1-input of said sixth bistate device, in such a manner that when said sixth bistate device is in its 0-condition it operates said first time counter device and said routine test device which resets said first time counter device each time a routine test has been successfully executed, the output of said first time counter device being activated when no routine tests have been successfully executed during a predetermined time interval counted in which case said sixth bistate device is set to its 1-condition thus inhibiting the operation of said first time counter device and of said routine test device.

27. The data processing system according to claim 26 and means for conducting routine tests on a switching network at regular time intervals, said routine test starting and checking the establishment of connections between test lines and junctor circuits included in said network.

28. The data processing system according to claim 27 and means for operating said supervision circuit including a scale-of-two counter, the 1-input and 0-output of which are connected to the respective outputs of first and second AND gates, the inputs of each of these gates being connected to the 1-output and to the 0-output of the first bistate devices associated with said two processing units, and the 1-output and 0-output of said scale-of-two counter being connected to the one inputs of a third and fourth AND gate, the other inputs of which are connected via a first OR gate to the output of a fifth AND-gate the inputs of which are connected to the output of said first time counter device and to the 0-outputs of said first bistate devices, and that the outputs of said third and fourth gates are each connected to the 1-inputs of the third and fourth bistate devices associated with different processing units, means responsive to the output of said first time counter device and both said processing units in the inoperative condition for setting the third bistate device associated with the processing unit which last became faulty to its 1-condition for starting programme testing, and means for setting the fourth bistate device of the other processing unit to its 1-condition to stop said other processing unit.

29. The data processing system according to claim 1, characterized in this, that each of said processing units comprises means for executing on-line test programmes to detect a faulty processing unit.

30. The data processing system according to claim 1, characterized in this, that the first and second processing units are interconnected by a first and a second interprocessor channel, whereas they are connected to said control system means via third, fourth and fifth, sixth channels respectively.

31. The data processing system according to claim 30, characterized in this, that an on-line test programme executed by said first processing unit comprises a first test consisting of checking the receipt of a clock signal emitted by said second processing unit via said second channel.

32. The data processing system according to claim 31, characterized in this, that an on-line test programme executed by said first processing unit comprises a second test consisting in setting to its 1-condition via said third channel the fifth bistate device associated with said second processing unit and in checking the receipt of an answer signal indicating this set condition and emitted via said fourth channel.

33. The data processing system according to claim 13, characterized in this, that an on-line test programme executed by said first processing unit comprises a third test consisting in setting via said first and fifth channels the fifth bistate device and associated with said second processing unit and in checking the receipt of an answer signal indicating this set condition via said fourth channel.

34. The data processing system according to claim 13, characterized in this, that an on-line test programme executed by said first processing unit comprises a fourth test consisting in sending information via said first channel to said second processing unit, in processing this information in this processing unit, and in checking the receipt of an answer signal transmitted via said second channel.

35. The data processing system according to claim 34, characterized in this, that when said second test is the only unsuccessful one, said third channel is faulty.

36. The data processing system according to claim 34, characterized in this, that when said third test is the only unsuccessful one, said fifth channel is faulty.

37. The data processing system according to claim 34, characterized in this, that when said fourth test is the only unsuccessful one, said second processing unit is faulty.

38. The data processing system according to claim 34, characterized in this, that when said first and fourth tests are the only unsuccessful ones, said second processing unit or said second channel is faulty assuming there is only one fault at the time.

39. The data processing system according to claim 34, characterized in this, that when said second and third tests are the only unsuccessful ones, said fifth bistate device or said fourth channel is faulty assuming there is only one fault at the time.

40. The data processing system according to claim 34, characterized in this, that when said third and fourth tests are the only unsuccessful ones, said first channel is faulty assuming there is only one fault at the time.

References Cited

UNITED STATES PATENTS

| | | | |
|---|---|---|---|
| 3,409,879 | 11/1968 | Keister | 340—172.5 |
| 3,374,465 | 3/1968 | Richmond et al. | 340—172.5 |
| 3,343,135 | 9/1967 | Freiman et al. | 340—172.5 |
| 3,303,474 | 2/1967 | Moore et al. | 340—172.5 |
| 3,286,236 | 11/1966 | Logan et al. | 340—172.5 |

GARETH D. SHAW, Primary Examiner